US009964072B2

(12) United States Patent
Jones

(10) Patent No.: US 9,964,072 B2
(45) Date of Patent: May 8, 2018

(54) PRESSURE SWITCH FOR THRUST REVERSER CONTROL

(71) Applicant: Goodrich Actuation Systems Limited, Solihull, West Midlands (GB)

(72) Inventor: Tony Jones, Birmingham (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 245 days.

(21) Appl. No.: 14/707,546

(22) Filed: May 8, 2015

(65) Prior Publication Data
US 2016/0003191 A1  Jan. 7, 2016

(30) Foreign Application Priority Data
Jul. 7, 2014 (EP) .................................. 14176006

(51) Int. Cl.
F16K 37/00 (2006.01)
F02K 1/76 (2006.01)

(52) U.S. Cl.
CPC .............. F02K 1/766 (2013.01); F02K 1/763 (2013.01); F16K 37/0041 (2013.01); F05D 2270/821 (2013.01)

(58) Field of Classification Search
CPC . F02K 1/76; F02K 1/763; F02K 1/766; F16K 37/0041; F15B 15/2807; F15B 15/2838
USPC ........................................... 200/81.9 R, 82 C
See application file for complete search history.

(56) References Cited

U.S. PATENT DOCUMENTS

| 3,649,785 A * | 3/1972 | Dietrich | H01H 21/285 200/47 |
| 4,413,549 A * | 11/1983 | Knable | F15B 15/2807 200/538 |
| 5,144,977 A * | 9/1992 | Eggerton | F16K 37/0033 137/554 |
| 5,445,188 A | 8/1995 | Bourkel et al. | |
| 5,906,222 A * | 5/1999 | Faulstich | F15B 15/2807 137/554 |

(Continued)

FOREIGN PATENT DOCUMENTS

EP    1069320 A2    1/2001
EP    1069320 A3    5/2002

(Continued)

OTHER PUBLICATIONS

European Patent Office Search Report; Application No. 14176006.6-1607; dated Jan. 20, 2015; 5 pages.

*Primary Examiner* — Thomas E Lazo
*Assistant Examiner* — Dustin T Nguyen
(74) *Attorney, Agent, or Firm* — Cantor Colburn LLP

(57) ABSTRACT

A hydraulically controlled pressure switch, comprising a spool having an elongate body with a first end and a second end, and an intermediate part between the two ends; a target movably connected to the second end of the spool by means of a spring; means for detecting movement of the target and providing an indication of pressure acting on the spool based on the movement of the target; whereby the spool is configured to cause movement of the target against the force of the spring based on the level of pressure acting against the first end, towards the spring, and also the level of pressure at the intermediate part between the two ends.

3 Claims, 2 Drawing Sheets

(56) References Cited

U.S. PATENT DOCUMENTS

| | | | |
|---|---|---|---|
| 6,213,147 B1 * | 4/2001 | Gramann | F01L 9/04 |
| | | | 123/90.11 |
| 6,682,016 B1 | 1/2004 | Peroulakis | |
| 6,789,570 B2 * | 9/2004 | Beyrak | F16K 11/0716 |
| | | | 137/554 |
| 9,091,285 B2 * | 7/2015 | Pigg | F15B 15/28 |
| 2012/0137654 A1 | 6/2012 | Burgess | |

FOREIGN PATENT DOCUMENTS

| | | |
|---|---|---|
| EP | 2045492 A2 | 4/2009 |
| EP | 2045492 A3 | 2/2013 |

\* cited by examiner

PRESSURE SWITCH FOR THRUST REVERSER CONTROL

CROSS REFERENCE TO RELATED APPLICATIONS

This application claims priority to European Patent (EP) Application No. 14176006.6 filed Jul. 7, 2014, the entire contents of which are incorporated herein by reference.

TECHNICAL FIELD

The present invention relates to pressure switches for thrust reverser systems.

BACKGROUND

Thrust reversers are used in aircraft to provide additional deceleration to the aircraft, for example on landing. A thrust reverser is generally, during flight, stowed or not active. When deployed, the thrust reverser acts to redirect the backwards thrust of the aircraft engine to a forward direction to slow the aircraft.

Generally a thrust reverser includes cowls that, in the stowed position, lie flat. Actuators, such as hydraulic actuators, cause the cowls to lift, on deployment, to cause redirection or reversal of the thrust. A controller, which again is commonly a hydraulic control, controls operation of the actuators.

Thrust reversers should generally not be deployed in flight. Erroneous deployment can be catastrophic and safety systems are required to prevent this. In particular, thrust reversers are provided with locks to secure the thrust reverser in the stowed position.

Commonly, thrust reversers are provided with hydraulic lock systems which are mounted on or in relation to the thrust reverser actuators. Such lock systems generally include an actuator means having a moveable element, e.g. a piston or bellows, responsive to hydraulic pressure to put the lock in the locked or unlocked position. The lock is, for increased safety, default biased to the locked position by means of, e.g., a biasing spring.

The lock is provided with a lock valve, operation of which is controlled by the thrust reverser control circuit. When the control circuit receives a command to deploy or stow the thrust reverser, it will also provide a command to the lock valve to unlock or lock the lock. The lock valve responds to control signals by selectively increasing or decreasing the pressure of hydraulic fluid supplied to the lock actuator to cause the moveable element to move to the locked or unlocked position. Lock systems that operate in this way are commonly known as Track locks. There are also mechanical locks within each of the actuators, which are actuated by the pressure in the piston head volume, and are biased closed by springs as with the Track lock. Track locks are generally referred to as secondary or tertiary locks, because they provide an additional line of defence for the system to account for possible failures within the actuator (primary) locks.

Hydraulic thrust reverser actuation systems typically include a pressure switch for monitoring the pressure state within the system which, in flight, should be isolated from supply pressure at all times to avoid erroneous unlocking of thrust reverser locks.

It is important that pressure switches only respond to 'true' pressure changes. Thrust reverser control systems can (and indeed must) continue to operate properly in the event of momentary transients in return pressure of the system. Such transients occur often in normal operation of an aircraft and switches should not be so sensitive that they are triggered each time such a transient occurs. The switches must, however, be responsive to real pressure changes for correct control of aircraft systems.

To avoid erroneously responding to acceptable pressure transients or fluctuations, absolute pressure switches are typically set to have a high response threshold. This gives rise, however, to the problem that relatively low control pressures are not detected.

Other systems use differential pressure sensors to avoid providing an indication in response to momentary transients in system return pressure. Transients within the system are common to the system and do not, therefore, create differentials in pressure, and differential pressure systems are only responsive to pressure differentials and not, therefore, sensitive to transients. A problem with differential pressure switches, however, is that they only detect differentials and would not, therefore, respond to a high absolute pressure throughout the system. Such pressure could be caused, for example, by a return line blockage. This would be undetectable by differential pressure sensors and could be catastrophic if not detected in flight.

FIG. 1 is a simple sectional view of a conventional pressure switch used in a thrust reverser actuation system of an aircraft.

The pressure switch comprises a hydraulic spool 1 that responds to control line pressure to drive a spring 2 loaded target 3 into range of a pair of proximity switches 4. The proximity switches respond to proximity of the target as it is moved by a sufficiently high control pressure against the force of the spring, to provide a pressure indication.

The conventional switch is arranged to respond to pressure in the control line 5 which is connected to the top of the spool. High pressure in this line could cause unlocking of the thrust reverser locks which, if undesired, e.g. during flight, could be catastrophic.

The lower end of the spool where it pushes onto the spring loaded target is dry, and is open to atmospheric pressure. A seal on the spool prevents leakage overboard at this interface. The central portion of the spool is connected to the system return line 6.

The return pressure connection into the centre spool section does not generate any force on the spool. The only purpose of this connection is to make sure that regardless of the control pressure, the external seal on the spool is only subjected to return pressure differential, minimising its friction and hence improving the switching accuracy of the switch. The conventional switch indicates pressure purely on the basis of whether the control pressure exceeds that required to overcome the spring.

A problem with this operation is that the response of the switch (based e.g. on the spring force) has to be set quite high to avoid undesired response to "normal" pressure transients, as mentioned above. The switch is set not to provide any indication in response to pressures lower than the maximum for "normal" system return transients. As mentioned above, this means that lower pressures, even if not transient pressures, would not be indicated.

The aim of the present invention, therefore, is to provide a pressure switch that is responsive to relatively small differentials between control line and return line pressures as well as to relatively high absolute pressures common to both lines, but avoiding responding to normal pressure transients.

SUMMARY

Accordingly, the present invention provides a hydraulically controlled pressure switch, comprising a spool having an elongate body with a first end and a second end, and an intermediate part between the two ends; a target movably connected to the second end of the spool by means of a spring; means for detecting movement of the target and providing an indication of pressure acting on the spool based on the movement of the target; whereby the spool is configured to cause movement of the target against the force of the spring based on the level of pressure acting against the first end, towards the spring, and also the level of pressure at the intermediate part between the two ends.

BRIEF DESCRIPTION OF THE DRAWINGS

Preferred embodiments will now be described, by way of example only, with reference to the drawings.

DETAILED DESCRIPTION

Figure 1:
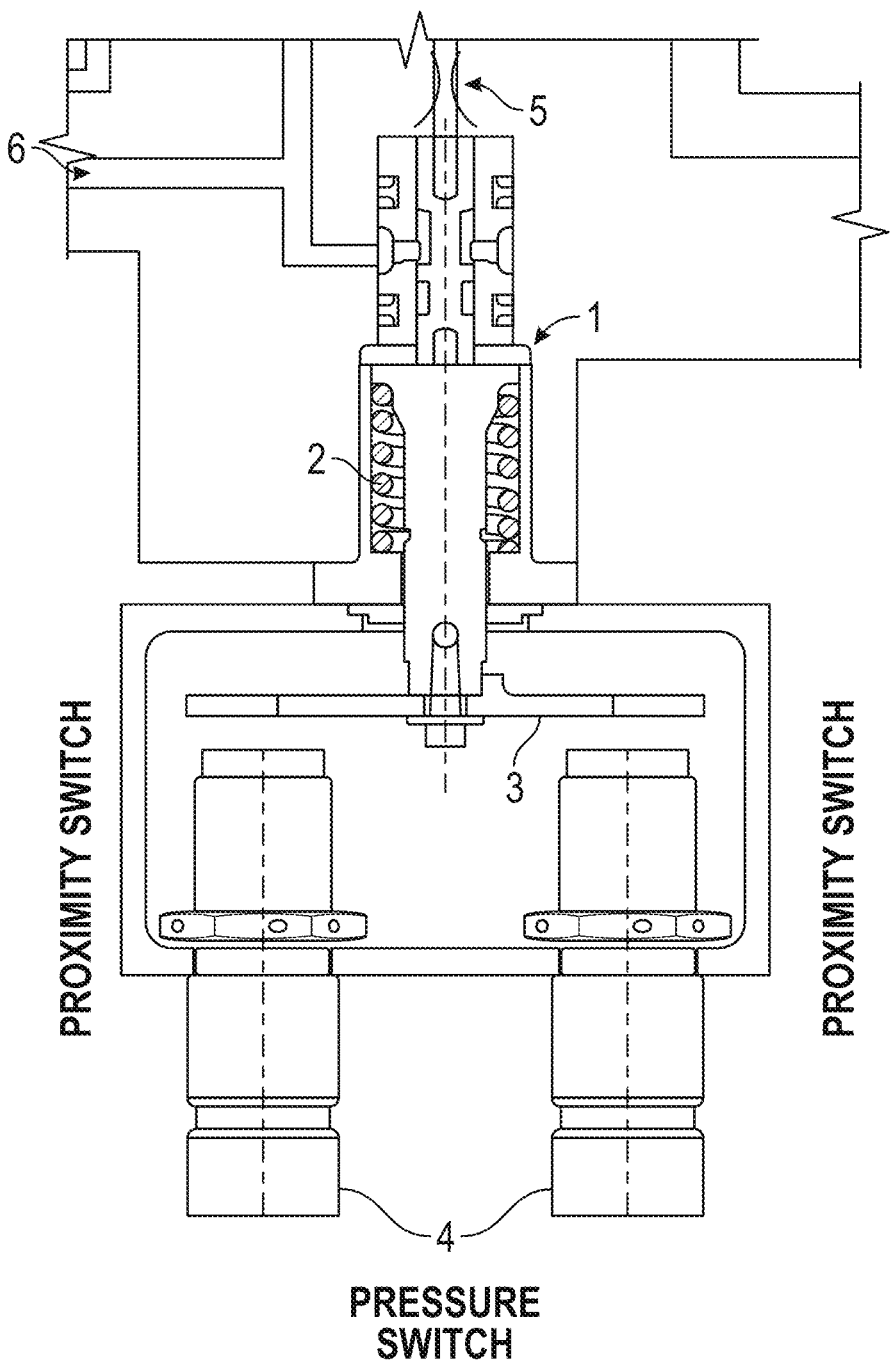
FIG. 1 is a simple schematic view of a conventional pressure switch.
Figure 2:
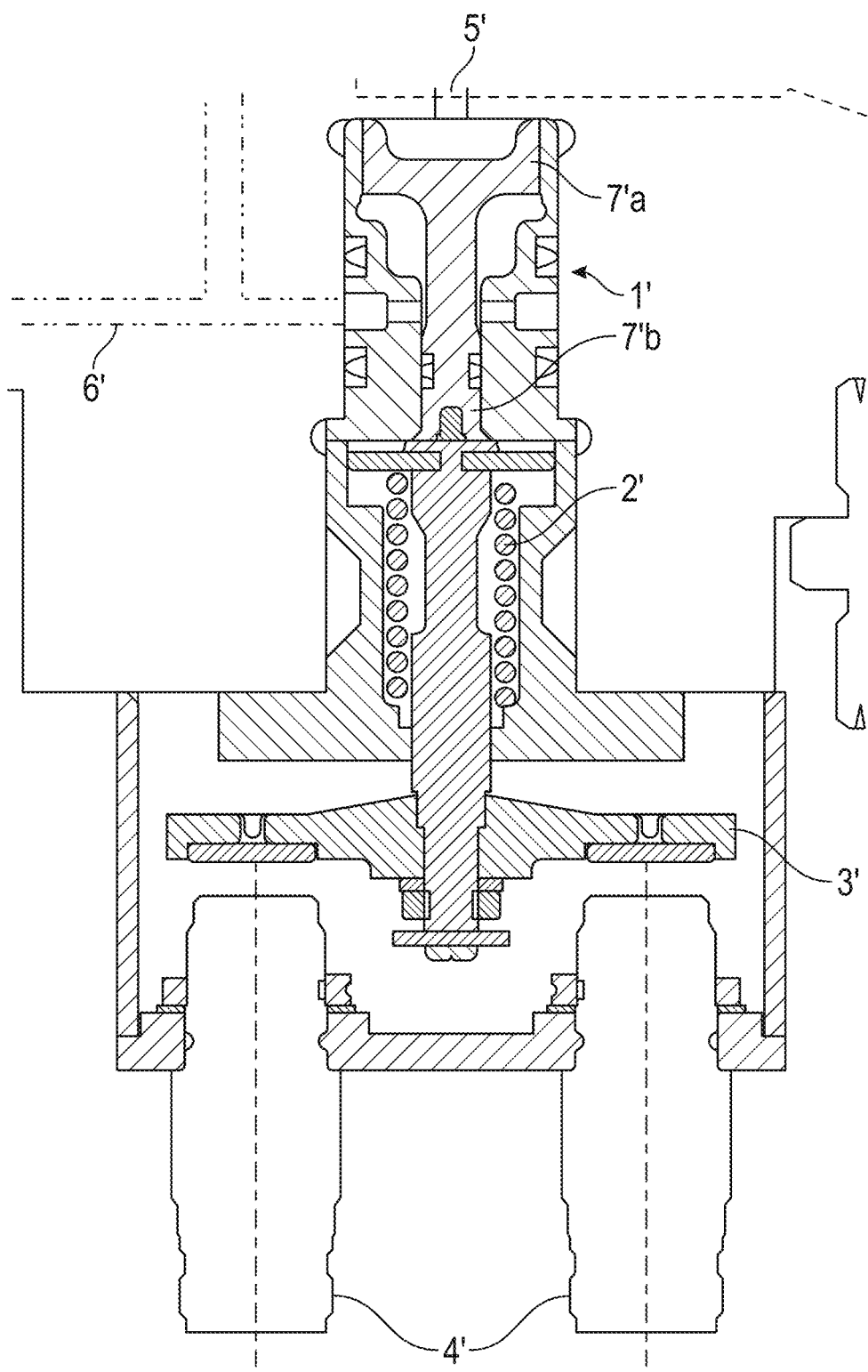
FIG. 2 is a simple schematic view of a pressure switch according to an embodiment of the invention.

The conventional switch has been described above with reference to FIG. 1. As mentioned, this switch is responsive to control pressure but cannot, therefore, detect low pressures.

The present invention provides an improved switch that operates in a manner similar to the conventional switch described above in relation to FIG. 1 but its response is based on both the control pressure 5' acting on the top of the spool 1' and the return pressure 6' acting in an area between the two ends 7'a, 7'b of the spool. The spool is configured to drive the spring 2' loaded target 3' relative to the proximity switches 4' based on the control pressure and the return pressure.

In the preferred embodiment, the spool 1' responds to the return pressure between its two ends by having the spool ends 7'a, 7'b being different shapes and/or sizes so as to present different areas to the acting pressure. Thus, in addition to reducing the friction of the outboard seal, the central pressure connection also creates a force bias on the spool. The improved switch indicates pressure on the basis of whether the combined effects of the control pressure and the central return connection generate enough force to overcome the spring. This could be either due to a small differential pressure between control and return, or due to a common high pressure in both the control and return connections.

In flight (with the system isolation valve closed) both the control and return connections of the switch should be at return pressure since the Isolation valve connects the system to return in flight. A general increase in aircraft return pressure within "normal" range would not result in a differential pressure across the large head 7'a of the spool, so would not cause the switch to indicate at too low a pressure. If the isolation valve was to develop a leak however, this would generate a differential pressure between the control and return connections which would be detected by the improved switch. Due to the differential areas, the switch can be designed such that its sensitivity to differential pressures is much less than the maximum return pressure of the aircraft, i.e. the switch can respond to differential pressures lower than the maximum possible return pressure transients, and also to high values of absolute pressure.

The improved switch therefore provides a simple configuration for providing pressure switch indication in the event of exceeding a defined differential pressure threshold, and also providing indication of exceeding a defined absolute pressure threshold.

The improved switch significantly reduces the level of pressure which it is possible to identify in a system where transient return pressures are high relative to normal operating pressures, whilst still providing detection of blocked return conditions.

The improved switch also enables dormant failure modes within the isolation control valve to be eliminated in systems where the transient return pressure exceeds the differential pressure required for system unlock.

The invention claimed is:

1. A hydraulically controlled pressure switch, comprising:
a spool having an elongate body with a first end and a second end, and an intermediate part between the two ends;
a control pressure line through which a control pressure acts on an outer surface of the first end;
a return pressure line through which a return pressure acts on the inner surfaces of the two ends at the intermediate part;
a target movably connected to the second end of the spool by means of a spring;
means for detecting movement of the target and providing an indication of pressure acting on the spool based on the movement of the target;
whereby the spool is configured to cause movement of the target against the force of the spring based on the level of the control pressure acting against the first end, towards the spring, and also the level of the return pressure at the intermediate part between the two ends; and
wherein the first and second ends present different areas to the return pressure at the intermediate part.

2. The switch of claim 1, wherein the first and second ends are different sizes.

3. The switch of claim 2, wherein the first end is larger than the second end.

\* \* \* \* \*